United States Patent
Zhong et al.

(10) Patent No.: US 10,165,615 B2
(45) Date of Patent: Dec. 25, 2018

(54) COMMUNICATION METHOD, AND TERMINAL

(71) Applicant: Huawei Technologies Co., Ltd., Shenzhen (CN)

(72) Inventors: Tao Zhong, Shenzhen (CN); Hongping Zhang, Shanghai (CN); Qinghai Zeng, Shanghai (CN); Mingzeng Dai, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 85 days.

(21) Appl. No.: 14/875,384

(22) Filed: Oct. 5, 2015

(65) Prior Publication Data

US 2016/0029427 A1 Jan. 28, 2016

Related U.S. Application Data

(63) Continuation of application No. PCT/CN2013/073943, filed on Apr. 9, 2013.

(51) Int. Cl.
*H04W 48/20* (2009.01)
*H04W 76/19* (2018.01)
(Continued)

(52) U.S. Cl.
CPC ........... *H04W 76/19* (2018.02); *H04L 1/1825* (2013.01); *H04L 1/1893* (2013.01); *H04L 1/22* (2013.01);
(Continued)

(58) Field of Classification Search
CPC ....... H04L 1/22; H04L 1/1825; H04L 1/1893; H04L 2001/0092; H04W 48/20;
(Continued)

(56) References Cited

U.S. PATENT DOCUMENTS 7,633,892 B2 * 12/2009 Yi .................. H04L 1/1841
370/300
2009/0034476 A1 * 2/2009 Wang .................... H04W 28/06
370/331
(Continued)

FOREIGN PATENT DOCUMENTS

CN 101409606 A 4/2009
CN 201256395 Y 6/2009
(Continued)

*Primary Examiner* — Mansour Oveissi
(74) *Attorney, Agent, or Firm* — Leydig, Voit & Mayer, Ltd.

(57) ABSTRACT

Embodiments of the present disclosure disclose a data retransmission communication method and a terminal for implementing inter-base station carrier aggregation, where the method includes: receiving, by a first Radio Link Control (RLC) entity of a terminal, a packet data unit PDU; and when the first RLC entity determines that the PDU reaches a maximum quantity of retransmissions, instructing, by the first RLC entity, a second RLC entity of the terminal to transmit the PDU, where the first RLC entity is corresponding to a first base station, and the second RLC entity is corresponding to a second base station. By using the method and the terminal in the embodiments, frequency of RRC connection re-establishment is reduced, and a data packet loss caused by frequent re-establishment is further avoided, thereby improving user experience.

14 Claims, 2 Drawing Sheets

(51) Int. Cl.
*H04W 76/18* (2018.01)
*H04W 76/15* (2018.01)
*H04W 72/04* (2009.01)
*H04L 1/22* (2006.01)
*H04L 1/18* (2006.01)
*H04W 88/02* (2009.01)
*H04W 88/08* (2009.01)
*H04L 1/00* (2006.01)

(52) U.S. Cl.
CPC ....... *H04W 48/20* (2013.01); *H04W 72/0453* (2013.01); *H04W 76/15* (2018.02); *H04W 76/18* (2018.02); *H04L 2001/0092* (2013.01); *H04W 88/02* (2013.01); *H04W 88/08* (2013.01)

(58) Field of Classification Search
CPC ........... H04W 70/0453; H04W 76/028; H04W 76/025; H04W 76/027; H04W 88/02; H04W 88/08
See application file for complete search history.

(56) References Cited

U.S. PATENT DOCUMENTS

| | | | |
|---|---|---|---|
| 2010/0035599 A1* | 2/2010 | Chen | H04W 76/028 455/422.1 |
| 2011/0013589 A1* | 1/2011 | Wu | H04W 72/10 370/331 |
| 2012/0120927 A1* | 5/2012 | Bucknell | H04B 7/022 370/336 |
| 2012/0281527 A1* | 11/2012 | Sebire | H04W 76/028 370/228 |
| 2013/0142032 A1 | 6/2013 | Wu | |
| 2014/0293903 A1* | 10/2014 | Kuo | H04W 24/02 370/329 |

FOREIGN PATENT DOCUMENTS

| | | |
|---|---|---|
| CN | 101959315 A | 1/2011 |
| CN | 101998475 A | 3/2011 |
| CN | 102104892 A | 6/2011 |
| WO | WO 2011139069 A2 | 11/2011 |
| WO | WO 2012064772 A1 | 5/2012 |

* cited by examiner

COMMUNICATION METHOD, AND TERMINAL

CROSS-REFERENCE TO RELATED APPLICATIONS

This application is a continuation of International Patent Application No. PCT/CN2013/073943, filed Apr. 9, 2013, which is hereby incorporated by reference in its entirety.

TECHNICAL FIELD

The present disclosure relates to the field of mobile communications technologies, and in particular, to an RLC (Radio Link Control, Radio Link Control) data retransmission communication method and a terminal for implementing inter-base station carrier aggregation (CA, Carrier Aggregation).

BACKGROUND

Development of the mobile Internet imposes higher requirements for quality of service and an Internet speed that can be provided by a cellular communications system. To further improve spectral efficiency and a user throughput of a system, a carrier aggregation technology is introduced to LTE-A (LTE-Advanced, LTE-Advanced): Carrier aggregation refers to that user equipment (User Equipment, UE) may simultaneously use multiple component carriers (CC, Component Carrier) to perform uplink and downlink communication, that is, the UE communicates with a network simultaneously in multiple cells, where each cell uses a carrier different from that used in another cell, so as to support high-speed data transmission. Of all these aggregated cells, one is a primary serving cell, and the other are secondary serving cells.

In an LTE system, carrier aggregation may be classified, according to locations of base stations, into intra-base station cell aggregation, inter-base station cell aggregation, and the like. The intra-base station cell aggregation refers to that serving cells aggregated for a UE all belong to a same base station. The inter-base station cell aggregation refers to that aggregated serving cells belong to different base stations, and better user experience can be brought in this aggregation manner.

In a current inter-base station carrier aggregation scenario, when data sent by a UE by using RLC of a secondary base station reaches a maximum quantity of retransmissions, in this case, if it is determined that a radio link failure occurs, and the UE initiates RRC (Radio Resource Control, radio resource control) connection re-establishment, a data packet loss will definitely be caused, thereby affecting user experience. Therefore, for an inter-base station cell aggregation manner, when an RLC entity of a secondary serving cell of the UE detects that a quantity of retransmissions reaches a maximum value, how to prevent the UE from initiating an RRC re-establishment process becomes a problem to be urgently resolved.

SUMMARY

Embodiments of the present disclosure provide a data retransmission communication method and a terminal for implementing inter-base station carrier aggregation, which can reduce, in an inter-base station carrier aggregation scenario, frequency of performing RRC connection re-establishment by a UE, and avoid a data packet loss, thereby improving user experience.

To resolve the forgoing problem, the technical solutions provided in the present disclosure are as follows:

A first aspect of the present disclosure provides a communication method, where a first implementation manner of the first aspect includes: receiving, by a first Radio Link Control RLC entity of a terminal, a packet data unit PDU; and when the first RLC entity determines that the PDU reaches a maximum quantity of retransmissions, instructing, by the first RLC entity, a second RLC entity of the terminal to transmit the PDU, where the first RLC entity is corresponding to a first base station, and the second RLC entity is corresponding to a second base station.

In a possible implementation manner, the receiving, by a first Radio Link Control RLC entity of a terminal, a packet data unit PDU specifically includes: receiving, by the first RLC entity, the PDU data sent by a common Packet Data Convergence Protocol PDCP entity of the terminal.

In another possible implementation manner, the receiving, by a first Radio Link Control RLC entity of a terminal, a packet data unit PDU specifically includes: receiving, by the first RLC entity, the PDU sent by a first PDCP entity of the terminal.

With reference to the first possible implementation manner, the instructing, by the first RLC entity, a second RLC entity of the terminal to transmit the PDU specifically includes: sending, by the first RLC entity, a retransmission indication to the common PDCP entity, where the retransmission indication includes information about the PDU, and the retransmission indication is used to instruct the second RLC entity to transmit the PDU.

With reference to the second possible implementation manner, the instructing, by the first RLC entity, a second RLC entity of the terminal to transmit the PDU specifically includes: sending, by the first RLC entity, a retransmission indication to the first PDCP entity, where the retransmission indication includes information about the PDU, and the retransmission indication is used to instruct the second RLC entity to transmit the PDU.

In a possible implementation manner, the information about the PDU is at least one of the following: a data packet of the PDU, and a serial number of the PDU.

In a possible implementation manner, the first base station is a primary base station, and the second base station is a secondary base station; or the first base station is a secondary base station, and the second base station is a primary base station.

Another aspect of the present disclosure also provides a terminal, where a possible implementation manner of the another aspect includes: a first Radio Link Control RLC entity, configured to: receive a packet data unit PDU and determine that the PDU reaches a maximum quantity of retransmissions; and a second RLC entity, configured to: when the first RLC entity determines that the PDU reaches the maximum quantity of retransmissions, retransmit the PDU according to an indication of the first RLC entity, where the first RLC entity is corresponding to a first base station, and the second RLC entity is corresponding to a second base station.

In a possible implementation manner, the terminal further includes a common Packet Data Convergence Protocol PDCP entity, separately connected to the first RLC entity and the second RLC entity, and configured to send the PDU data to the first RLC entity.

In another possible implementation manner, the terminal further includes a first PDCP entity, separately connected to the first RLC entity and the second RLC entity, and configured to send the PDU to the first RLC entity.

With reference to the first possible implementation manner, the first RLC entity is specifically configured to send a retransmission indication to the common PDCP entity, where the retransmission indication includes information about the PDU, and the retransmission indication is used to instruct the second RLC entity to retransmit the PDU.

With reference to the second possible implementation manner, the first RLC entity is specifically configured to send a retransmission indication to the first PDCP entity, where the retransmission indication includes information about the PDU, and the retransmission indication is used to instruct the second RLC entity to retransmit the PDU.

In a possible implementation manner, the information about the PDU is at least one of the following: a data packet of the PDU, and a serial number of the PDU.

In a possible implementation manner, the first base station is a primary base station, and the second base station is a secondary base station; or the first base station is a secondary base station, and the second base station is a primary base station.

It may be learned that by using the method and the terminal in the embodiments of the present disclosure, when it is detected that a PDU reaches a maximum quantity of retransmissions, an RRC connection re-establishment process is not initiated by a secondary base station, and instead, an RLC entity on the side of a primary base station is instructed to retransmit the PDU that reaches the maximum quantity of retransmissions, which reduces frequency of performing RRC connection re-establishment by a UE, and further avoids a data packet loss caused by frequent re-establishment, thereby improving user experience.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

A terminal refers to a device providing voice and/or data connectivity for a user, and may be a wireless terminal or a wired terminal. The wireless terminal may be a handheld device with a wireless connection function, or another processing device connected to a wireless modem, or may be a mobile terminal that communicates with one or more core networks by using a radio access network. For example, the wireless terminal may be a mobile phone (also referred to as a "cellular" phone) and a computer with a mobile terminal. For another example, the wireless terminal may also be a portable, pocket-sized, handheld, computer built-in, or in-vehicle mobile apparatus. For still another example, the wireless terminal may be a mobile station (mobile station), an access point (access point), or user equipment (user equipment, UE for short).

The base station may be a device that communicates with the wireless terminal over an air interface in an access network by using one or more cells. For example, the base station may be a base transceiver station (base transceiver station, BTS for short) in a GSM or CDMA, may be a NodeB (NodeB) in WCDMA, or may be an evolved NodeB (evolved Node B, eNB or e-NodeB for short) in LTE or a base station in an advanced network, which is not limited in the present disclosure.

Figure 1:
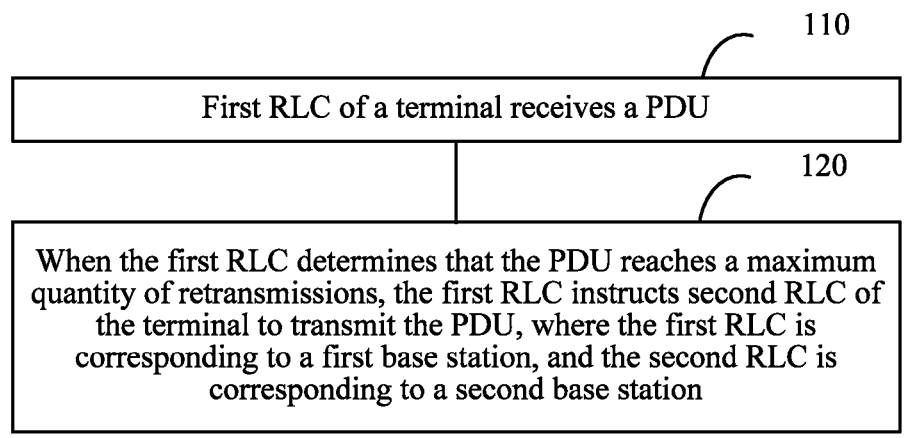
FIG. 1 is a schematic flowchart of a data retransmission communication method for implementing inter-base station carrier aggregation according to an embodiment of the present disclosure.

An embodiment of the present disclosure provides a communication method. As shown in FIG. 1, the method includes the following steps:

Step 110: A first RLC entity of a terminal receives a PDU (Packet Data Unit, packet data unit).

Specifically, in this embodiment, the first RLC entity of the terminal may receive PDU data sent by an upper layer entity of the first RLC entity. An example in which an RLC entity, of the terminal, corresponding to a secondary base station is used as the first RLC entity of the terminal, and an RLC entity, of the terminal, corresponding to a primary base station is used as a second RLC entity of the terminal is used for specific description below, which, however, is not limited thereto.

(1) When a common RRC entity and a common PDCP (Packet Data Convergence Protocol, Packet Data Convergence Protocol) entity exist in a protocol stack of the terminal, in an inter-base station carrier aggregation scenario, two RLC protocol entities respectively corresponding to the primary base station and the secondary base station exist in the terminal. When there is uplink data to be sent, a data packet on a data radio bearer is distributed, by using the common PDCP entity, to the RLC entity corresponding to the primary base station and the RLC entity corresponding to the secondary base station. Therefore, in this embodiment, the RLC entity corresponding to the secondary base station may receive PDU data sent by the common PDCP entity, and the PDU data may be sent after being obtained by performing header compression, numbering, and encryption by the common PDCP entity on upper layer data. Specific operations of header compression, numbering, and encryption may be performed in a prior-art manner, and details are not described herein again in this embodiment.

(2) When a common RRC entity exists in a protocol stack of the terminal, but no common PDCP entity exists in the protocol stack of the terminal, in an inter-base station carrier aggregation scenario, the terminal has two RLC entities respectively corresponding to the primary base station and the secondary base station and two PDCP entities respectively corresponding to the primary base station and the secondary base station. When there is uplink data to be sent, the PDCP entity, in the protocol stack of the terminal, corresponding to the primary base station performs header compression, numbering, and encryption on upper layer data and delivers the upper layer data to the RLC entity corresponding to the primary base station, and then the RLC entity corresponding to the primary base station distributes a PDU data packet on a data radio bearer to a MAC entity corresponding to the primary base station and the PDCP entity corresponding to the secondary base station. In this case, the PDCP entity corresponding to the secondary base station transparently transmits, to the RLC entity corresponding to the secondary base station, an RLC PDU received from the RLC entity corresponding to the primary base station. Therefore, in this embodiment, the RLC entity corresponding to the secondary base station may receive the PDU data sent by the PDCP entity corresponding to the secondary base station, and transmit, after adding a packet header to the PDU, the PDU to a MAC entity corresponding to the secondary base station. Specific operations of header compression, numbering, and encryption may be performed in a prior-art manner, and details are not described herein again in this embodiment.

Step 120: When the first RLC entity determines that the PDU reaches a maximum quantity of retransmissions, the first RLC entity instructs a second RLC entity of the terminal to transmit the PDU, where the first RLC entity is corresponding to a first base station, and the second RLC entity is corresponding to a second base station.

It should be noted that after the RLC entity corresponding to the secondary base station detects that the RLC PDU reaches a maximum quantity of retransmissions, that is, after a quantity of retransmissions by the RLC entity reaches a maximum value, the terminal determines that a radio link failure occurs. However, in this embodiment, in this case an RRC connection re-establishment process is not initiated by the secondary base station, and instead, the RLC entity corresponding to the primary base station is instructed to retransmit the PDU that reaches the maximum quantity of retransmissions, which reduces frequency of performing RRC connection re-establishment by the terminal, and further avoids a data packet loss caused by frequent re-establishment, thereby improving user experience.

Specifically, for that the RLC entity corresponding to the secondary base station may receive PDU data sent by different upper layer entities, in this embodiment, the RLC entity corresponding to the primary base station may be instructed in multiple manners to retransmit the PDU that reaches the maximum quantity of retransmissions. Details are provided below, which, however, is not limited thereto.

A. After the RLC entity corresponding to the secondary base station detects that an RLC PDU reaches a maximum quantity of retransmissions, first, a common PDCP entity is instructed to perform retransmission of a data packet. Specifically, the RLC entity corresponding to the secondary base station sends a retransmission indication to the common PDCP entity to notify the common PDCP entity that the RLC PDU on the RLC entity corresponding to the secondary base station reaches the maximum quantity of retransmissions, where the retransmission indication includes information about the PDU that reaches the maximum quantity of retransmissions. Then, the common PDCP entity resends the PDU to the RLC entity of the primary base station according to the indication, and the RLC entity corresponding to the primary base station retransmits the PDU according to a pre-allocated SN. It should be noted that in this embodiment, the information about the PDU that is transmitted by the RLC entity corresponding to the secondary base station back to the common PDCP entity should include at least a data packet of the PDU or a data packet number of the PDU.

B. After the RLC entity corresponding to the secondary base station detects that an RLC PDU reaches a maximum quantity of retransmissions, the PDCP entity corresponding to the secondary base station sends a retransmission indication to the RLC entity corresponding to the primary base station, where the retransmission indication includes information about the PDU that reaches the maximum quantity of retransmissions. After receiving the retransmission indication transmitted back by the PDCP entity corresponding to the secondary base station, the RLC entity corresponding to the primary base station retransmits the PDU according to a pre-allocated SN. It should also be noted that in this embodiment, the information about PDU that is included in the retransmission indication sent by the PDCP entity corresponding to the secondary base station to the RLC entity corresponding to the primary base station should include at least a data packet of the PDU or a data packet number of the PDU. Details are not described herein again.

Optionally, the first base station is a primary base station, and the second base station is a secondary base station; or the first base station is a secondary base station, and the second base station is a primary base station.

Figure 2:
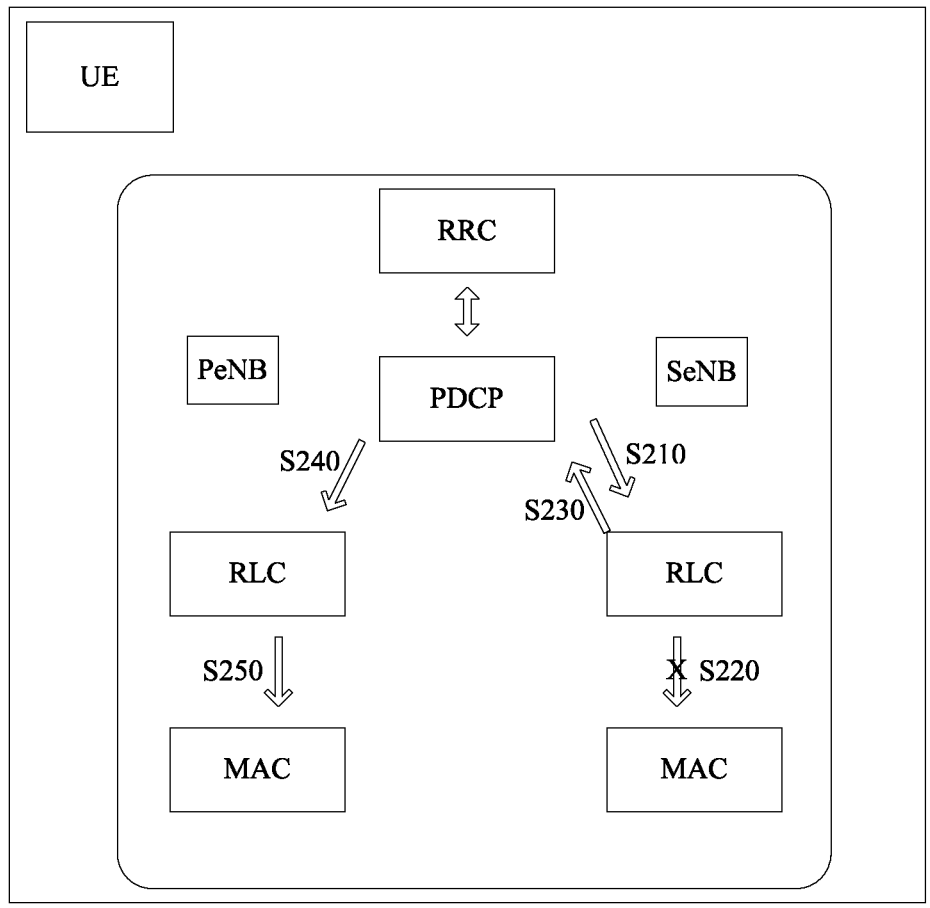
FIG. 2 is a schematic flowchart of another data retransmission communication method for implementing inter-base station carrier aggregation according to an embodiment of the present disclosure.

A specific data retransmission process is used as an example below to describe in detail the data retransmission communication method for implementing inter-base station carrier aggregation in the foregoing embodiment. As shown in FIG. 2, when a common PDCP entity of a terminal is responsible for distributing a data packet, the method includes the following steps:

S210. After performing header compression, numbering, and encryption on upper layer data, the common PDCP entity delivers the upper layer data to an RLC entity corresponding to a secondary base station.

S220. When sending an RLC PDU to a MAC entity corresponding to the secondary base station, the RLC entity corresponding to the secondary base station detects whether the PDU reaches a maximum quantity of retransmissions, and if yes, performs step S230.

S230. The RLC entity corresponding to the secondary base station transmits, back to the common PDCP entity, information about the PDU that reaches the maximum quantity of retransmissions.

S240. The common PDCP entity resends, according to the information transmitted back by the RLC entity corresponding to the secondary base station, a corresponding PDU data packet to an RLC entity corresponding to a primary base station.

S250. The RLC entity corresponding to the primary base station sends the RLC PDU to a MAC entity corresponding to the primary base station, to complete data retransmission.

Figure 3:
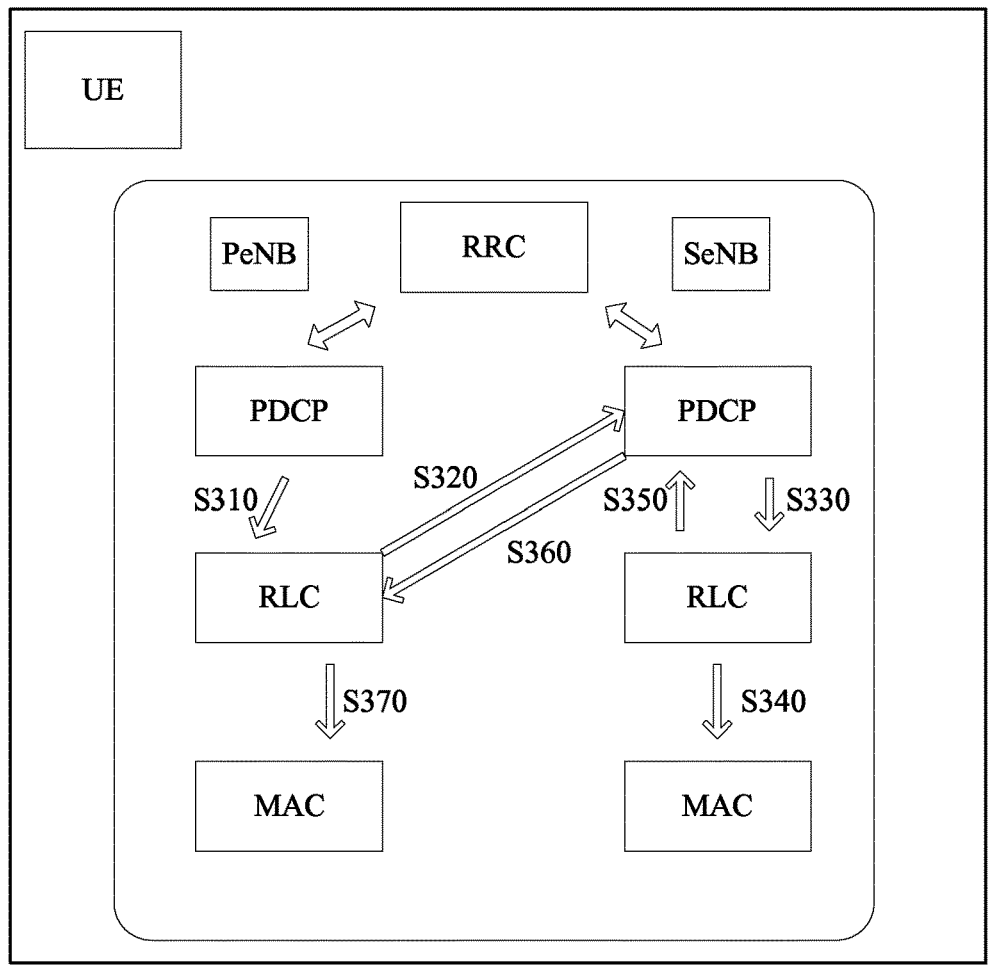
FIG. 3 is a schematic flowchart of still another data retransmission communication method for implementing inter-base station carrier aggregation according to an embodiment of the present disclosure.

Another specific data retransmission process is used as an example below to describe in detail the data retransmission communication method for implementing inter-base station carrier aggregation in the foregoing embodiment. As shown in FIG. 3, when an RLC entity, of a terminal, corresponding to a primary base station is responsible for distributing a data packet, the method includes the following steps:

S310. After performing header compression, numbering, and encryption on upper layer data, a PDCP entity corresponding to the primary base station delivers the upper layer data to the RLC entity corresponding to the primary base station.

S320. After generating an RLC PDU, the RLC entity corresponding to the primary base station sends the RLC PDU to a PDCP entity corresponding to a secondary base station.

S330. The PDCP entity corresponding to the secondary base station transparently transmits the received RLC PDU to an RLC entity corresponding to the secondary base station.

S340. After re-adding an RLC packet header of the RLC entity corresponding to the secondary base station, the RLC entity corresponding to the secondary base station transmits the RLC PDU to a MAC entity corresponding to the secondary base station.

S350. After finding that an RLC PDU reaches a maximum quantity of retransmissions, the RLC entity corresponding to the secondary base station notifies the PDCP entity corresponding to the secondary base station.

S360. The PDCP entity corresponding to the secondary base station instructs the RLC entity corresponding to the primary base station to perform retransmission of the PDU.

S370. The RLC entity corresponding to the primary base station sends the PDU to a MAC entity corresponding to the primary base station, to complete data retransmission.

It should be noted that in this embodiment, the primary base station and the secondary base station that perform information exchange with the RLC of the terminal may be transposed, that is, the primary base station may perform actions of the secondary base station in this implementation manner, and the secondary base station may perform actions of the primary base station in this implementation manner. Details are not described herein again in this embodiment.

It may be learned that in a prior-art implementation solution, after a terminal finds that a quantity of retransmissions of an RLC entity reaches a maximum value, the terminal determines that a radio link failure occurs. In this case, the terminal initiates an RRC connection re-establishment process. However, in an intra-base station cell aggregation manner, serving cells aggregated for the terminal all belong to a same base station and are controlled by only one base station. Therefore, it is relatively appropriate that the terminal initiates an RRC connection re-establishment process when a radio link failure occurs. However, in an inter-base station carrier aggregation scenario, when data sent by the terminal by using RLC of a secondary base station reaches a maximum quantity of retransmissions, if it is determined, in this case, that a radio link failure occurs, and then the terminal initiates RRC connection re-establishment, a data packet loss will definitely occur. By using the method in this embodiment of the present disclosure, when it is detected that the PDU reaches the maximum quantity of retransmissions, an RRC connection re-establishment process is not initiated by the secondary base station, and instead, an RLC entity corresponding to a primary base station is instructed to retransmit the PDU that reaches the maximum quantity of retransmissions, which reduces frequency of performing RRC connection re-establishment by the terminal, and further avoids a data packet loss caused by frequent re-establishment, thereby improving user experience.

Figure 4:
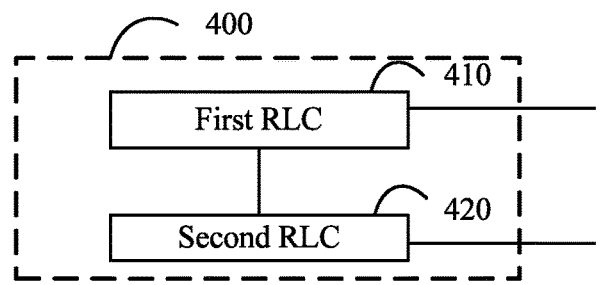
FIG. 4 is a schematic structural diagram of a data retransmission terminal for implementing inter-base station carrier aggregation according to an embodiment of the present disclosure.

Based on the same idea as the foregoing, another embodiment of the present disclosure also proposes a data retransmission terminal for implementing inter-base station carrier aggregation. As shown in FIG. 4, the terminal 400 includes a first RLC entity 410 and a second RLC entity 420.

The first RLC entity 410 is configured to: receive a packet data unit PDU and determine that the PDU reaches a maximum quantity of retransmissions, and the second RLC entity 420 is configured to: when the first RLC entity determines that the PDU reaches the maximum quantity of retransmissions, retransmit the PDU according to an indication of the first RLC entity, where the first RLC entity is corresponding to a first base station, and the second RLC entity is corresponding to a second base station.

The terminal 400 may further include a common Packet Data Convergence Protocol PDCP entity (not shown in the figure), separately connected to the first RLC entity and the second RLC entity, and configured to send the PDU data to the first RLC entity.

In addition, the terminal 400 may further include a first PDCP entity (not shown in the diagram), separately connected to the first RLC entity and the second RLC entity, and configured to send the PDU to the first RLC entity.

It should be noted that the first RLC entity is specifically configured to send a retransmission indication to the common PDCP entity, where the retransmission indication includes information about the PDU, and the retransmission indication is used to instruct the second RLC entity to retransmit the PDU.

In addition, in this embodiment, the first RLC entity is specifically configured to send a retransmission indication to the first PDCP entity, where the retransmission indication includes information about the PDU, and the retransmission indication is used to instruct the second RLC entity to retransmit the PDU.

The information about the PDU should include at least a data packet of the PDU and/or a serial number of the PDU.

It should be noted that in this embodiment, the first base station is a primary base station, and the second base station is a secondary base station; or the first base station is a secondary base station, and the second base station is a primary base station.

It should be noted that a person skilled in the art easily understands that various data retransmission terminals for implementing inter-base station carrier aggregation described in the foregoing embodiments may also exist as a part of another communications device, and implement data retransmission in various communications device in compliance with the descriptions in the foregoing embodiments; therefore, a communications device that includes the data retransmission terminal for implementing inter-base station carrier aggregation in the foregoing embodiments shall fall within the protection scope of this application, and details are not described herein again.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present disclosure.

In combination with the embodiments disclosed in this specification, method or algorithm steps may be implemented by computer hardware, a software module executed by a processor, or a combination thereof.

For the foregoing descriptions of the disclosed embodiments, the person skilled in the art can implement or use the embodiments of the present disclosure. Various modifications to the embodiments are obvious to the person skilled in the art, and general principles defined in this specification may be implemented in other embodiments without departing from the spirit or scope of the embodiments of the present disclosure. Therefore, the embodiments of the present disclosure will not be limited to the embodiments described in this specification but extends to the widest scope that complies with the principles and novelty disclosed in this specification.

The foregoing descriptions are merely exemplary embodiments of the present disclosure, but are not intended to limit the embodiments of the present disclosure. Any modification, equivalent replacement, and improvement made without departing from the spirit and principle of the embodiments of the present disclosure shall fall within the protection scope of the embodiments of the present disclosure.

What is claimed is:

1. A communication method comprising:
    detecting, by a terminal, that a quantity of retransmission of data by a first Radio Link Control (RLC) entity reaches a maximum value, wherein the terminal comprises the first RLC entity;
    initiating, by the terminal, a radio resource control (RRC) connection re-establishment when serving cells aggregated for the terminal belong to one base station; and
    retransmitting, by the terminal, the data after reaching the maximum value of retransmissions, and not initiating the RRC connection re-establishment, when
        a) the serving cells for the terminal belongs to a first base station and a second base station, and
        b) the first and the second base stations simultaneously communicate with the terminal;
    wherein (a) the first RLC entity is associated with the second base station, and (b) the terminal further comprises a second RLC entity which is associated with the first base station.

2. The method according to claim 1, further comprising:
    sending, by the terminal, an indication to the first base station associated with a radio link failure corresponding to the secondary base station.

3. The method according to claim 1, wherein the data is a packet data unit (PDU) and the method further comprises:
    instructing, by the first RLC entity, the second RLC entity included in the terminal to transmit the PDU when the first RLC entity determines that the PDU reaches the maximum quantity of retransmissions.

4. The method according to claim 3, wherein instructing the second RLC entity to transmit the PDU further comprises:
    sending, by the first RLC entity, a retransmission indication to a common Packet Data Convergence Protocol (PDCP) entity,
    wherein the retransmission indication comprises information about the PDU, and information instructing the second RLC entity to transmit the PDU.

5. The method according to claim 3, wherein instructing the second RLC entity to transmit the PDU further comprises:
    sending, by the first RLC entity, a retransmission indication to a Packet Data Convergence Protocol (PDCP) entity of the terminal,
    wherein the retransmission indication comprises information about the PDU, the PDCP entity of the terminal is associated with the second base station, and the retransmission indication is used to instruct the second RLC entity to transmit the PDU.

6. A terminal comprising:
    a processor; and
    a memory coupled to the processor and storing processor-executable instructions which when executed causes the processor to implement operations including:
        a) detecting that a maximum value of a quantity of retransmitted data,
        b) when cells aggregated for serving the terminal belong to one base station, initiating a radio resource control (RRC) connection re-establishment, and
        c) when the aggregated serving cells belong to more than one base stations, and when the more than one base stations simultaneously communicate with the terminal retransmitting the data after reaching the maximum value of retransmissions, and not initiating the RRC connection re-establishment.

7. The terminal according to claim 6, wherein the operations include:
    sending an indication to one of the more than one base stations associated with a radio link failure corresponding to another one of the more than one base stations.

8. The terminal according to claim 6 including first and second radio link control (RLC) entities, wherein
    the first RLC entity is configured to receive a packet data unit (PDU) and determine that the PDU reaches a maximum quantity of retransmissions; and
    the second RLC entity is configured to retransmit the PDU according to an indication of the first RLC entity when the first RLC entity determines that the PDU reaches the maximum quantity of retransmissions.

9. The terminal according to claim 8, wherein
    the first RLC entity is further configured to send a retransmission indication to a common Packet Data Convergence Protocol (PDCP) entity;
    the retransmission indication comprises information about the PDU and the retransmission indication is used to instruct the second RLC entity to transmit the PDU; and
    the common PDCP entity is configured to send the PDU data to the first RLC entity.

10. The terminal according to claim 8, wherein
    the first RLC entity is further configured to send a retransmission indication to a Packet Data Convergence Protocol (PDCP) entity of the terminal;
    the retransmission indication comprises information about the PDU and information instructing the second RLC entity to transmit the PDU; and
    the PDCP entity configured to send the PDU data to the first RLC entity.

11. A non-transitory, computer readable medium storing instructions for execution by a processor in a terminal comprising Radio Link Control (RLC) entities for communicating with base stations, the instructions:
    instructions for detecting that a quantity of retransmission of data by a first RLC entity reaches a maximum value;
    instructions for initiating a radio resource control (RRC) connection re-establishment when serving cells aggregated for the terminal belong to one base station; and
    instructions for retransmitting the data after reaching the maximum value of retransmissions, and not initiating the RRC connection re-establishment when the aggregated serving cells belong to more than one base station that are in simultaneous communication with the terminal.

12. The non-transitory, computer readable medium storing instructions according to claim 11, further comprising:
instructions for sending an indication to one of the more than one base stations that is associated with a radio link failure corresponding to another one of the more than one base stations.

13. The non-transitory, computer readable medium storing instructions according to claim 11, wherein the data is a packet data unit (PDU), and the instructions further include:
instructions for instructing one of the RLC entities to transmit the PDU when another of the RLC entities determines that the retransmissions of the PDU have reached the maximum quantity.

14. The non-transitory, computer readable medium storing instructions according to claim 11, wherein the instructions further include:
instructions for sending a retransmission indication to a Packet Data Convergence Protocol (PDCP) entity of the terminal, wherein the retransmission indication comprises information about the PDU and for transmitting the PDU.

* * * * *

UNITED STATES PATENT AND TRADEMARK OFFICE
CERTIFICATE OF CORRECTION

PATENT NO.         : 10,165,615 B2
APPLICATION NO.    : 14/875384
DATED              : December 25, 2018
INVENTOR(S)        : Zhong et al.

Page 1 of 1

It is certified that error appears in the above-identified patent and that said Letters Patent is hereby corrected as shown below:

In the Claims

Claim 3, Column 9, Line 49-50 "the second RLC entity included in the terminal to transmit" should read -- the second RLC entity to transmit --

Signed and Sealed this
Seventeenth Day of September, 2019

Andrei Iancu
*Director of the United States Patent and Trademark Office*